Oct. 31, 1939.  E. V. SWANGREN  2,177,846
ELECTRIC INSECT DESTROYER
Filed June 8, 1935  4 Sheets-Sheet 1
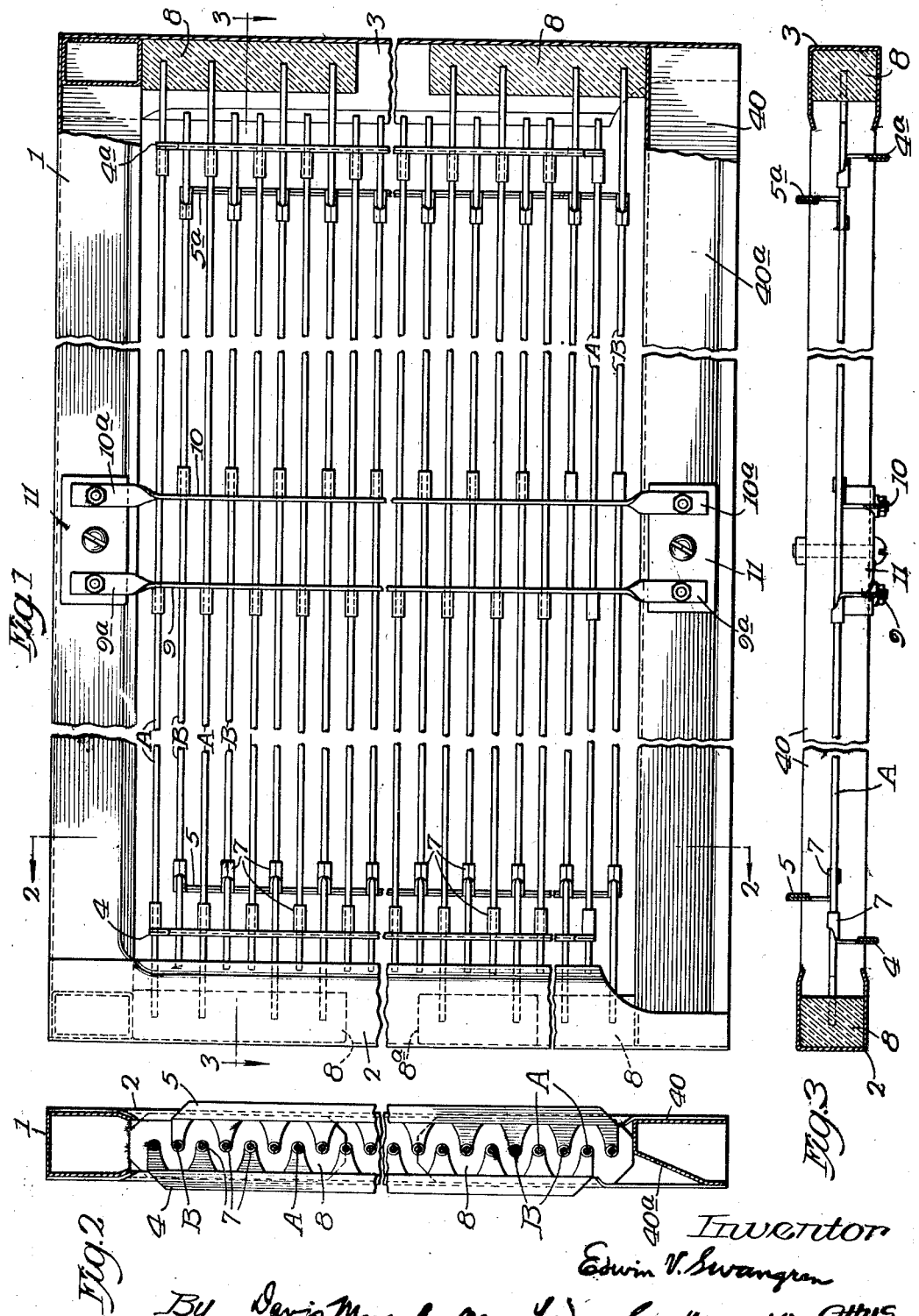

Oct. 31, 1939.  E. V. SWANGREN  2,177,846
ELECTRIC INSECT DESTROYER
Filed June 8, 1935  4 Sheets-Sheet 2
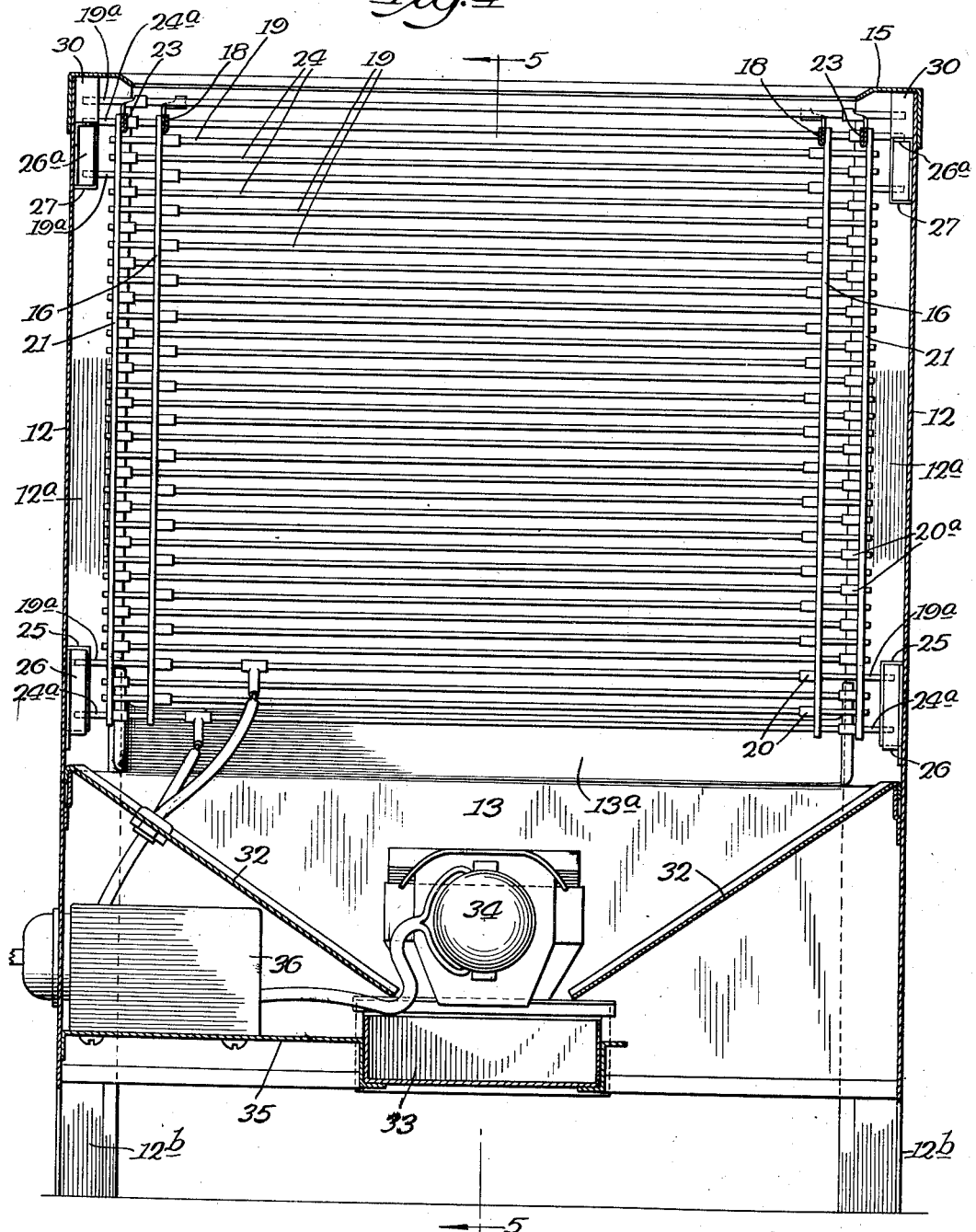

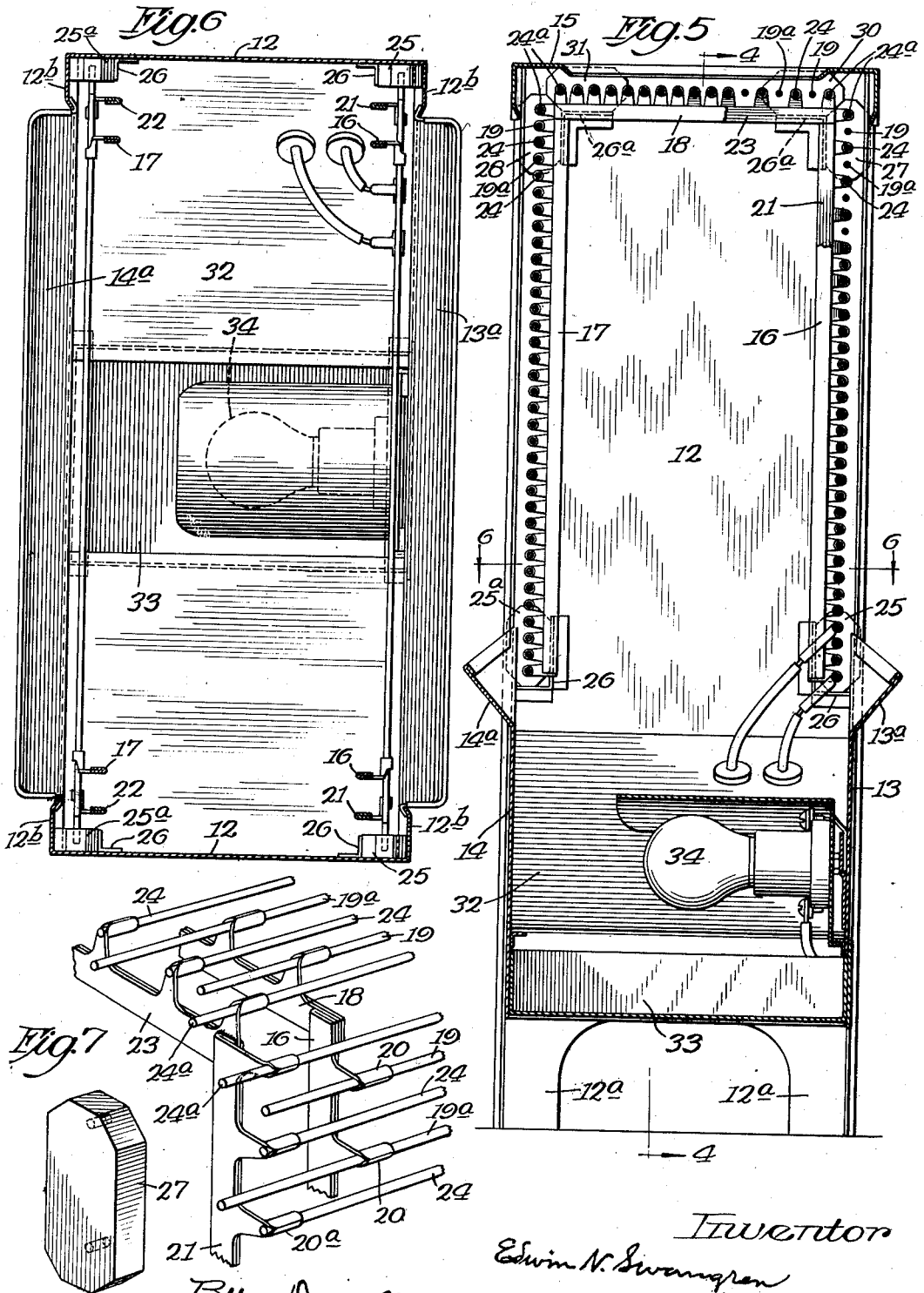

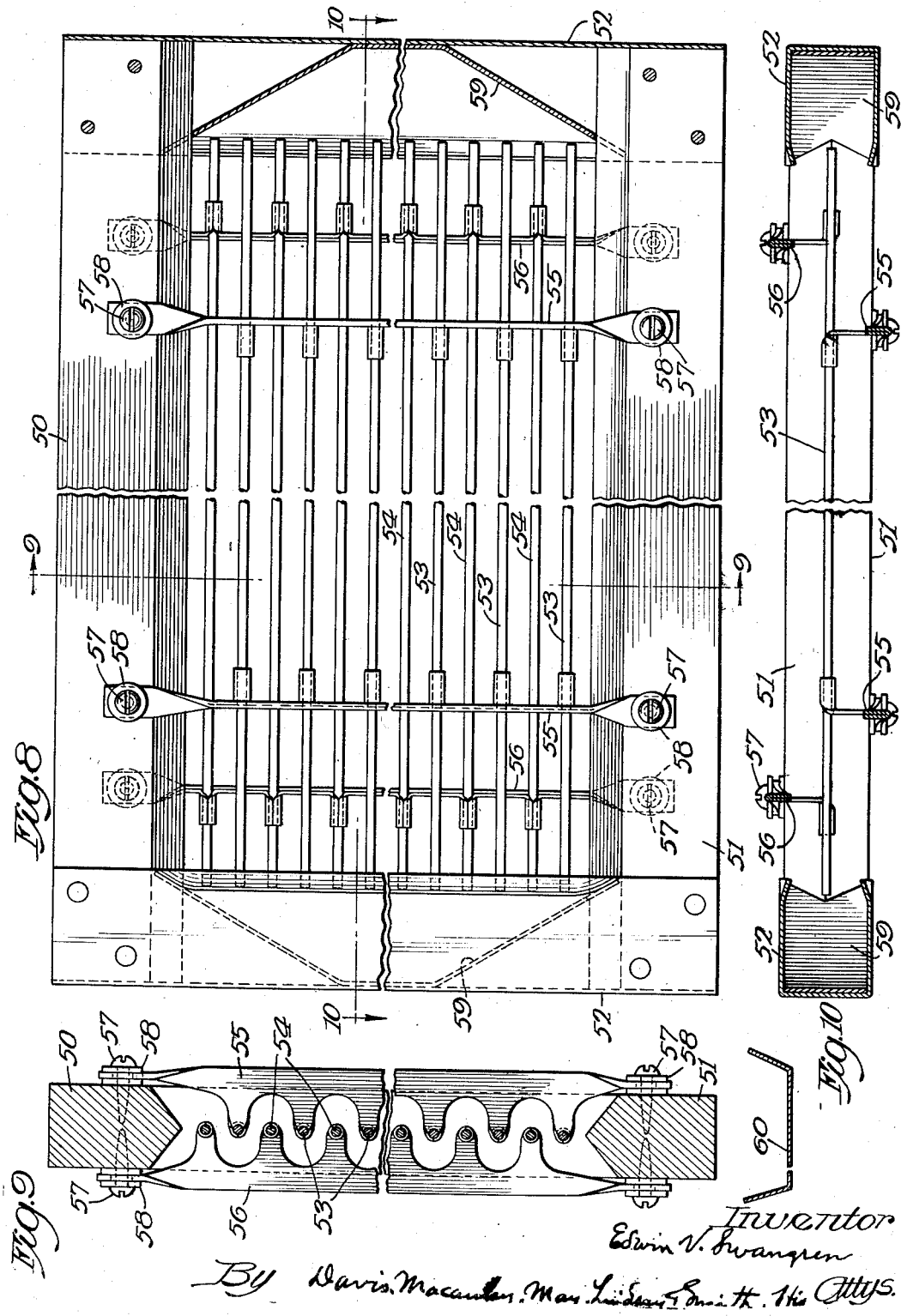

Patented Oct. 31, 1939

2,177,846

UNITED STATES PATENT OFFICE 2,177,846

ELECTRIC INSECT DESTROYER

Edwin V. Swangren, Chicago, Ill., assignor of one-half to Walter N. Stevenson, Evanston, Ill.

Application June 8, 1935, Serial No. 25,576

18 Claims. (Cl. 43—112)

My invention relates to improvements in electric fly traps and screens of the type employing two groups of narrowly spaced wires electrically charged with current of high tension and forming electrodes, the wires of one group being so arranged with relation to the wires of the other group that when a fly or other insect alights upon any wire of one group it will touch, or so nearly touch a wire of the other group, that a current of electricity will pass through and destroy it.

The object of my present invention, generally, is to provide improved means for flexibly yet securely mounting and supporting the two groups of wires forming the electrodes of the device in the supporting frame by a new organization and arrangement of the associated parts and members in such a manner as to provide adequate support and insulation and be particularly efficient and desirable for the ends in view, while minimizing, so far as possible, liability of short-circuiting of the wires by reason of dampness from snow or rain, or the accumulation of the bodies of flies which have been electrocuted, or other causes, and also prevent breakage of insulating elements of a brittle and unyielding nature, such as porcelain, or glass. With these purposes, and incidental advantages of strength, simplicity and economy in the construction of the parts in view, which will be apparent from the description hereinafter given, I have designed the improved fly trap and screen illustrated in different forms of embodiment in the accompanying drawings, and my invention resides in the novel construction and arrangement of the parts and novel details of construction illustrated and hereinafter described, the essential elements of my invention being more particularly pointed out in the appended claims.

In the drawings:

Figure 1 is a face view of a flat screen embodying my invention in one form suitable for installation in a window or door opening, broken to show omission of portions thereof;

Fig. 2 is a vertical section of the same in a plane indicated by the line 2—2 of Fig. 1;

Fig. 3 is a horizontal section of the same on the line 3—3 of Fig. 1;

Fig. 4 is a vertical section of a different embodiment of my invention in the form of a closed fly trap having a rectangular casing provided at the bottom with an electric lamp forming a lure for the insects, the plane of the section being indicated by the section line 4—4 of Fig. 5;

Fig. 5 is a vertical section of the same in a plane indicated by the line 5—5 of Fig. 4;

Fig. 6 is a horizontal section of the same in a plane taken on the line 6—6 of Fig. 5;

Fig. 7 is a fragmentary perspective illustrating the connection of the conducting members at a corner of the casing, one insulating member being shown detached;

Fig. 8 is a face view of a modified form of flat screen;

Fig. 9 is a vertical section of the same on the line 9—9 of Fig. 8; and

Fig. 10 is a horizontal section of the same on the line 10—10 of Fig. 8.

Like reference characters indicate like parts in all the figures of the drawings.

Describing first the flat screen illustrated in Figs. 1, 2 and 3, the top frame member 1 and the side members 2 and 3 are formed of U-shaped bars of sheet metal welded together at the corners of the frame. The bottom frame member 40, also formed of sheet metal similarly welded to the side members, may be formed on what will be termed its front face with an inclined upper portion 40a, as shown in Fig. 2, to deflect flies destroyed by the electrodes and falling therefrom to the outside. The front sides of the side members 2 and 3 are in the present instance cut away adjacent the bottom, as illustrated in Fig. 1 to permit the bodies of destroyed flies or other foreign matters which might otherwise accumulate between the sides of the U-shaped bars to pass outwardly upon the inclined portion of the bottom frame member and be deflected to the outside of the screen.

The electrodes consist of two sets of wires, one set comprising the wires A, and the other the wires B, each set being mechanically (and electrically) connected in the form of a grid, and the two sets being insulated from each other and mounted in the frame so that they lie in a single plane with wires of one grid alternating with those of the other. The wires A are connected together by a pair of cross-bars 4 and 4a near their opposite ends, while the wires B are connected by similar cross-bars 5 and 5a parallel with and near the bars 4 and 4a, the bars 4 and 4a being in the present instance, though not necessarily, arranged on one side of the plane of the wires and the bars 5 and 5a on the other.

The specific construction of the cross-bars is particularly well adapted to attain a desirable combination of strength in spacing the bars apart and at the same time supporting them to form a grid having a slight degree of flexibility.

To this end the bars, which are severally arranged edgewise, at right angles, or approximately so, to the plane of the grids, are each formed of sheet metal preferably longitudinally folded on the outer edge of the bar to afford a proper degree of longitudinal strength and stiffness against flexing in an edgewise direction, and finger sections 7 which extend at right angles to the plane of the longitudinal portions of the bar and are cylindrically rolled around the wires A, or B, as the case may be, to frictionally grip them and form the particular grid.

The two grids are mounted in the frame by means of insulating blocks 8 of any suitable material, as for instance, porcelain, four such blocks being employed in the present instance. In the form of my invention now being described each block is formed with four orifices, or sockets, the two upper blocks being arranged to receive in their two upper orifices the two uppermost wires A of one grid, and in their lower orifices to receive two wires B of the other grid, and the two lower blocks being arranged to similarly receive in their lower orifices the two lower wires B of the second-mentioned grid and in their upper orifices two higher wires A of the first mentioned grid, all the wires so engaged being of such length as to extend into the sockets, while the remaining wires extend only a slight distance within the edges of the frame bars which are preferably, as shown, formed with narrow flanges at their inner edges, to better protect the ends of the wires. The blocks 8 are not secured to the frame bars but fit easily therein and are held in place by their engagement with the wires of the grids. It will be noted that the edgewise disposition of the bars holds all the wires in the central plane while the relation of the parts is such that a slight degree of flexing of the frame may take place without danger of cracking the insulator blocks. The blocks and ends of the shorter wires are well protected within the channels of the frame bars, and liability of short circuiting between the electrodes from rain is minimized.

In the case of wide screens, one or more intermediate pairs of cross-bars, as the cross-bars 9 and 10, best shown in Fig. 1, may be secured severally to the wires A and B, to further strengthen the grids and hold the wires in properly spaced relation. These bars may be formed with cylindrically rolled finger sections clasping the wires of the associated grid, similar to the bars 4 and 5 (and 4a and 5a), but differing therefrom in that the ends of their longitudinal portions, marked 9a and 10a, respectively, are twisted to permit them to be fastened to insulating blocks 11 secured to the top and bottom frame members. In the case of narrow screens no intermediate cross-bars will be needed.

It may also be desirable, in the case of large screens, to employ one or more pairs of intermediate insulating blocks, as the blocks 8a shown at the left side of Fig. 1, and these blocks may be formed to engage one wire of each screen, as illustrated, or two wires, as in the case of the blocks 8.

It will be understood that the electrodes are designed to be connected to the opposite poles of a suitable source of high tension electric current, at whatever point is most convenient in the particular situation, one means of connection being hereinafter described in connection with the form of my invention illustrated in Figs. 4 to 7, see particularly Fig. 4.

Describing next the apparatus illustrated in Figs. 4 to 7, inclusive, of the drawings, this form of my invention is a fly trap provided with an electric light forming a lure to attract the flies and cause them to light on the electrically charged grids, by which they are destroyed. The trap consists of a rectangular sheet metal frame or casing arranged to support the grids and the light and a transformer for converting electric current of ordinary commercal voltage (usually 110 volts) to a voltage of appropriate higher tension. The frame includes end plates 12—12, flanged and cut to provide legs 12a at the lower corners of the trap and inwardly extending vertical flanges 12b which, opposite the grid members hereinafter described, serve as a protection for the ends of the wires of the electrode; rectangular front and rear panels at the lower part of the casing marked 13 and 14, respectively, connecting the lower portions of the end plates, and a rectangular top frame member 15 which it will be understood consists of a removable open frame fitting over the top of the end plates of the casing, the end plates and front and rear panels being rigidly secured together in any suitable manner, as by spot-welding. The top portions of the front and rear frame panels are formed with inclined outward flanges, marked 13a and 14a respectively, to deflect the flies destroyed by the wires of the electrodes above them into the interior of the casing.

The electrodes consist of two grids, each having a front, top and rear section, which grids are out of electrical contact with each other and are mounted in the frame in such relation that the wires of each section of the grid lie in a common plane with the wires of the corresponding section of the other grid.

One grid consists of two front cross-bars 16—16 two rear cross bars 17—17 and two top cross bars 18—18, all secured together, and wires 19 and 19a secured in cylindrical sockets formed by rolling the end portions of fingers 20 of the cross-bars 16, 17 and 18, similar to the construction previously described of the screen illustrated in Figs. 1, 2 and 3. The other is similarly constructed, with front cross-bars 21—21, rear cross-bars 22—22, top cross-bars 23—23, and wires 24 and 24a clasped by the fingers 20a of the cross-bars.

To provide for supporting and insulating the screens in the casing, one of the wires, marked 19a, of each section of one grid, near each end of each of the cross-bars 16, 17 and 18, is longer than the remaining wires of the grid section which includes such cross-bars and wires 19 and 19a, and, similarly, one of the wires, of each section of the grid, marked 24a, near each end of cross-bars 21, 22 and 23 is longer than the remaining wires, marked 24, of the three sections of such other grid.

The ends of the cross-bars 18 of the grid first described are secured (by spotwelding or in other suitable manner) to the upper ends of the front cross-bar 16 and rear cross bar 17, and the wire members of the top section of the grid likewise include a pair of the longer wires 19a, the remaining wires being made shorter and extending but a short distance within the protecting flanges of the top frame member 15, as in the similar construction of the front and rear sections of the grid. The cross bars 23 of the other grid are similarly secured to the front and rear cross-bars 21 and 22, and the wires forming the electrodes similarly consist of a pair of the longer wires 24a and shorter wires 24.

Opposite the lower ends of the two front crossbars 16 of one grid and the two front cross-bars 21 of the other grid, the longer wires 19ᵃ of one front grid section and the longer wires 24ᵃ of the other front grid section engage orifices extending partway through a lower front pair of insulating blocks 25—25 which may be formed of porcelain or glass—and at the rear of the casing adjacent the lower ends of the rear cross bars 17 and 22 of the two grids, the longer wires 19ᵃ and 24ᵃ of the two grids similarly engage a pair of similar lower rear insulating blocks 25ᵃ—25ᵃ, the blocks 25 and 25ᵃ all being supported but not secured to right-angled flanged brackets 26 secured at front and rear to the end plates of the casing. A pair of similar upper front insulating blocks 27—27 opposite the top ends of the front cross-bars 16 and 21 are similarly engaged by the upper longer wires 19ᵃ and 24ᵃ of the front sections of the two grids, and pairs of upper rear insulating blocks 28—28 are similarly engaged by opposite ends of the longer wires 19ᵃ and 24ᵃ adjacent the top ends of the rear cross-bars 17 and 22 of the rear sections of the two grids. I also employ spacing and insulating blocks of similar construction to provide further support to the top sections of the two grids, the two top front insulating blocks marked 30—30, engaging the opposite ends of a longer wire 19ᵃ of the top section of one grid and also the longer wires 24ᵃ of the top section of the other grid, adjacent and disposed at right angles to the blocks 27—27, and the two top rear blocks, marked 31—31, similarly engaging the opposite ends of the longer wires 19ᵃ of the top section of one grid and also the longer wires 24ᵃ of the top section of other grid adjacent and at right angles to the rear upper insulating blocks 28.

The blocks 27 and 30 are beveled at their meeting inner edges to fit against each other, and the blocks 28 and 31 are similarly constructed, see Fig. 5. Pairs of flanged right angled brackets 26ᵃ secured to the end plates of the frame within the angles between each block 27 and the adjacent block 30 and also between each block 28 and adjacent block 31 are provided to prevent displacement. It will be understood that all the insulating blocks make easy engagement with the seats formed by the different brackets, sufficient to provide a slight flexibility between the grids and frame, but that they are supported by the wires of the two grids engaging them and are not secured to the frame. The construction thus described provides for accurate spacing and alignment of the wires of the grids, with a sufficient degree of flexibility to permit some distortion of the frame and grid members, and with minimum liability of shortcircuiting the current between the grids from moisture or the accumulation of foreign matter in confined spaces between them, as is apt to occur in other devices of similar character known to me.

Within the casing and below the level of the grids is arranged a pair of inclined hopper plates 32 extending downwardly towards the center from the two end walls of the casing, the opening between which lies above a drawer 33, to receive the bodies of flies killed by the grids and falling therefrom. Above the level of the opening between the hopper plates I provide an electric lamp 34, to serve as a lure for attracting the flies, and in a compartment of the casing below one of the hopper plates I have provided a shelf 35 to receive the transformer 36. In the present instance one of the leads from the transformer is connected with one of the wires 19ᵃ of one grid, and the other lead with one of the wires 24ᵃ of the other grid, as shown.

In Figs. 8, 9 and 10 I have illustrated a simpler form of screen, embodying certain features of my invention, which will now be described.

In this form of screen the top and bottom frame members, marked 50 and 51, respectively, are made of wood and the end or side members 52—52 are formed of sheet metal, U-shaped in cross-section, secured to the top and bottom members, as in the case of the side members of the form of screen shown in Figs. 1, 2 and 3, heretofore described.

The wires 53 of one grid, and the similar wires 54 of the other grid are in this case all of such length as to extend but a short distance inwardly past the edges of the frame members 52 on each side of the frame. The wires 53 are supported by a pair of cross-bars 55 secured to the top and bottom frame members and arranged parallel with the side members 52 a short distance therefrom, while the wires 54 are similarly supported by a pair of cross-bars 56. The cross-bars are longitudinally folded and are provided with finger sections rolled to provide cylindrical sockets to clasp and hold the wire, in the same manner as the cross-bars employed in the forms of my invention previously described. The ends of the cross-bars are twisted at an angle of 90°, to better provide for securing them to the frame bars. The cross-bars may be conveniently supported upon the members 50 and 51 by screws 57, insulating washers 58 being used to attain more perfect insulation.

To provide for deflecting outside the screen flies which have been destroyed by the electrodes, the top and bottom wooden frame members are beveled outwardly from the center line of the inner side of such members (see Fig. 9) the screen thus being made reversible and symmetrical in appearance. Further, to the same end, I have provided a pair of double deflecting plates 59, secured to the rear cross portion of the side frame members 52.

A pan 60 below the screen may be used to collect the destroyed flies.

I claim:

1. In an electric insect destroyer, the combination of a frame having side members each formed with an inwardly opening recess, a pair of electrodes having each a set of parallel wires and a pair of cross-bars arranged oppositely near the ends of said wires and secured thereto, at least one of the wires near the top and one of the wires near the bottom of each electrode being longer than some of the others, and a pair of upper insulating blocks and a pair of lower insulating blocks orificed to engage said longer wires and seated in said recesses in the side frame members.

2. In an electric insect destroyer, the combination of a frame having side members each formed with an inwardly opening recess, a pair of electrodes having each a set of parallel wires and a pair of cross-bars arranged oppositely near the ends of said wires and secured thereto, at least one of the wires near the top and one of the wires near the bottom of each electrode being longer than some of the others, and a pair of upper insulating blocks and a pair of lower insulating blocks formed with sockets extending part way therethrough to receive the ends of said longer wires, said blocks being seated in said recesses in the side frame members.

3. In an electric insect destroyer, the combination of a frame having side members each formed with an inwardly opening recess, a pair of electrodes having each a set of parallel wires and a pair of cross-bars arranged oppositely near the ends of said wires and secured thereto, at least one of the wires near the top and one of the wires near the bottom of each electrode being longer than some of the others, and a pair of upper insulating blocks and a pair of lower insulating blocks orificed to engage said longer wires and loosely seated in said recesses in the side frame members.

4. In an electric insect destroyer of the type described and having a pair of grid electrodes each consisting of a set of parallel stiff wires, cross-bar members for spacing and connecting the wires of each grid each consisting of a folded strip of sheet metal extending edgewise intermediate the ends of the wires in a plane at right angles to the plane of the grid and formed with offset finger portions rolled to form sockets arranged to make rigid engagement with said wires.

5. In an electric insect destroyer, the combination of a frame having U-shaped sheet metal side members opening inwardly, a pair of electrodes having each a set of parallel wires and a pair of cross-bars near the opposite ends of said wires and secured thereto, at least one of the wires near the top and one of the wires near the bottom of each electrode being longer than some of the others, and a pair of upper insulating blocks and a pair of lower insulating blocks formed with sockets extending part way therethrough to receive the ends of said longer wires, said blocks being seated in the channels of said side frame members.

6. In an electric insect destroyer, the combination of a frame having U-shaped sheet metal side members opening inwardly, a pair of electrodes having each a set of parallel wires and a pair of cross-bars near the opposite ends of said wires and secured thereto, at least one of the wires near the top and one of the wires near the bottom of each electrode being longer than some of the others, and a pair of upper insulating blocks and a pair of lower insulating blocks formed with sockets extending part way therethrough to receive the ends of said longer wires, said blocks being seated in the channels of said side frame members, and the ends of the shorter wires of said electrodes terminating adjacent the plane of the edges of the side portions of said frame members.

7. In an electric insect destroyer, the combination of a frame having U-shaped sheet metal side members opening inwardly, a pair of electrodes having each a set of parallel wires and a pair of cross-bars near the opposite ends of said wires and secured thereto, at least one of the wires near the top and one of the wires near the bottom of each electrode being longer than some of the others, and a pair of upper insulating blocks and a pair of lower insulating blocks formed with sockets extending part way therethrough to receive the ends of said longer wires, said blocks being seated in the channels of said side frame members, and the ends of the shorter wires of said electrodes extending into said channels a short distance past the edges of the side portions of said frame members.

8. In an electric insect destroyer, the combination of a rectangular frame having top and bottom members and side members, a pair of grid electrodes consisting each of a set of parallel stiff wires, non-conducting means for supporting said wires in said side frame members and cross-bar members for spacing and supporting the central portion of the wires of each grid consisting of sheet metal strips disposed edgewise intermediate the ends of the wires in a plane at right angles to the plane of the grid, said strips being formed with finger portions rigidly secured to said wires, the ends of said longitudinal strips being secured to the top and bottom members of the frame.

9. An electric insect trap comprising a frame having end plates and front and rear panels connecting the lower portions of said end plates, and a pair of grid electrodes having each connected front and rear sections above the plane of said panels and a top section, each electrode consisting of a set of parallel wires and a pair of U-shaped cross-bars secured to said wires near their opposite ends, the wires of the two grids being arranged in alternate order and certain of said wires of each grid being longer than the remaining wires, and means for supporting said grid electrodes in said frame consisting of oppositely arranged insulating blocks loosely mounted in said frame and arranged to receive the opposite ends of the longer wires and thereby support said grids, the ends of said shorter wires being free from said frame.

10. An electric insect trap according to claim 9 in which the recited means for supporting the electrodes includes pairs of lower front and rear insulating blocks, and also pairs of upper front and rear insulating blocks arranged to engage longer wires of the front and rear sections, respectively, of the two grids adjacent the angles between the top section and said front and rear sections, respectively, of the grids.

11. An electric insect trap according to claim 9 in which the recited means for supporting the electrodes includes pairs of lower front and rear insulating blocks, and also pairs of upper front and rear insulating blocks arranged to engage longer wires of the front and rear sections respectively, of the two grids, and also pairs of insulating blocks arranged to engage longer wires of the top sections of the two grids.

12. An electric insect trap according to claim 9 in which the recited pair of U-shaped cross-bars of each electrode consists of connected strips of sheet metal disposed inside the wires of the electrode and having offset finger portions folded to engage said wires.

13. An electric insect trap comprising a frame having end plates and front and rear panels connecting the lower portions of said end plates, said panels having upwardly and outwardly inclined flanges at their top edges, and a pair of grid electrodes having each connected front and rear sections above the plane of said panels and a top section, each grid consisting of a set of parallel wires non-conductively supported in said frame and the wires of the two grids being arranged in alternate order, and collecting means arranged between said panels including a pair of inclined deflecting plates spaced apart at the bottom, and a receptacle between the lower edges of said plates.

14. In an electric insect destroyer, the combination of a frame having side members each formed with an inwardly opening recess, a pair of electrodes having each a set of parallel wires and a pair of cross-bars arranged oppositely near the ends of said wires and secured thereto, at least one of the wires near the top and one of the wires near the bottom and one of the wires near an intermediate point of each electrode being longer than some of the others, and a pair of upper insulating blocks and a pair of lower insulating blocks and a pair of intermediate insulating blocks orificed to engage said longer wires and loosely seated in said recesses in the side frame members.

15. In an electric insect destroyer, the combination of a frame having top and bottom members and side members, a pair of grid electrodes each consisting of a set of parallel stiff wires and a pair of cross-bars arranged oppositely near the ends of said wires and secured thereto, and means for insulating and supporting said grids in said frame comprising a pair of upper insulating blocks formed with sockets and a pair of lower insulating blocks supported by said side members adjacent the corners of the electrodes and the ends of at least one wire of each electrode being arranged to engage the sockets in said insulating blocks.

16. In an electric insect destroyer, the combination of a frame having top and bottom members and side members, a pair of grid electrodes each consisting of a set of parallel stiff wires and a pair of offset cross-bars arranged oppositely near the ends of said wires and secured thereto, and means for insulating and supporting said grids in said frame with their wires in a common plane comprising a pair of upper insulating blocks formed with sockets and a pair of lower insulating blocks supported by said side members adjacent the corners of the electrodes and the ends of at least one wire of each electrode being arranged to engage the sockets in said insulating blocks.

17. In an electric insect destroyer, the combination of a frame having top and bottom members and a pair of U-shaped side members arranged with their side flanges extending inwardly, a pair of grid electrodes each consisting of a set of parallel stiff wires and a pair of cross-bars arranged oppositely near the ends of the wires and secured thereto, and means for insulating and supporting said grids in said frame comprising pairs of upper and lower insulating blocks formed with sockets and housed within the flanges of said side members adjacent the corners of said electrodes and the ends of at least one wire of each electrode being arranged to engage the sockets in said insulating blocks.

18. An electric insect destroyer according to claim 17 in which the insulating blocks therein recited are loosely fitted between the flanges of the U-shaped side members.

EDWIN V. SWANGREN.